United States Patent [19]
Kubota et al.

[11] Patent Number: 5,523,996
[45] Date of Patent: Jun. 4, 1996

[54] LASER LIGHT MODULATION METHOD AND APPARATUS FOR RECORDING DIGITAL AUDIO SIGNALS ON CINEFILM

[75] Inventors: Shigeo Kubota; Atsuhi Fukumoto, both of Kanagawa; Hiroshi Suganuma, Ibaragi, all of Japan

[73] Assignee: Sony Corporation, Tokyo, Japan

[21] Appl. No.: 244,841

[22] PCT Filed: Oct. 18, 1993

[86] PCT No.: PCT/JP93/01498

§ 371 Date: Jun. 14, 1994

§ 102(e) Date: Jun. 14, 1994

[87] PCT Pub. No.: WO94/09492

PCT Pub. Date: Apr. 28, 1994

[30] Foreign Application Priority Data

Oct. 16, 1992 [JP] Japan .................... 4-278912

[51] Int. Cl.[6] .................... G11B 7/00; G03B 31/00
[52] U.S. Cl. .................... 369/124; 369/62; 360/3; 352/37; 352/27; 352/25
[58] Field of Search .................... 369/124.62, 275.1, 369/275.3, 116, 124; 360/1, 2, 3; 352/37, 26, 25, 24, 27, 19, 20, 17

[56] References Cited

U.S. PATENT DOCUMENTS

| | | | |
|---|---|---|---|
| 4,085,296 | 4/1978 | Keegan | 369/124 |
| 4,603,099 | 7/1986 | Drexler | 369/275.1 |
| 5,155,510 | 10/1992 | Beard | 352/27 |
| 5,194,996 | 3/1993 | Shores | 360/2 |
| 5,386,255 | 1/1995 | Beard et al. | 352/5 |

*Primary Examiner*—Tan Dinh
*Attorney, Agent, or Firm*—Limbach & Limbach; W. Patrick Bengtsson

[57] ABSTRACT

The present invention comprises a method and apparatus for recording digital audio information using light modulation of a laser beam on cinefilm. In the invention, a laser beam of low coherence and high output is radiated from a semiconductor laser having a wide radiating area, modulated within the depth of focus of the laser beam, and then illuminated on a sound track of a cinefilm. In one embodiment the laser beam is bifurcated into first and second beams using a diffraction lattice. The invention shortens the recording time for voice data, reduces speckle noise, and eliminates the need for polarizing plates, thereby simplifying the structure and reducing the production costs of the recording apparatus.

15 Claims, 9 Drawing Sheets

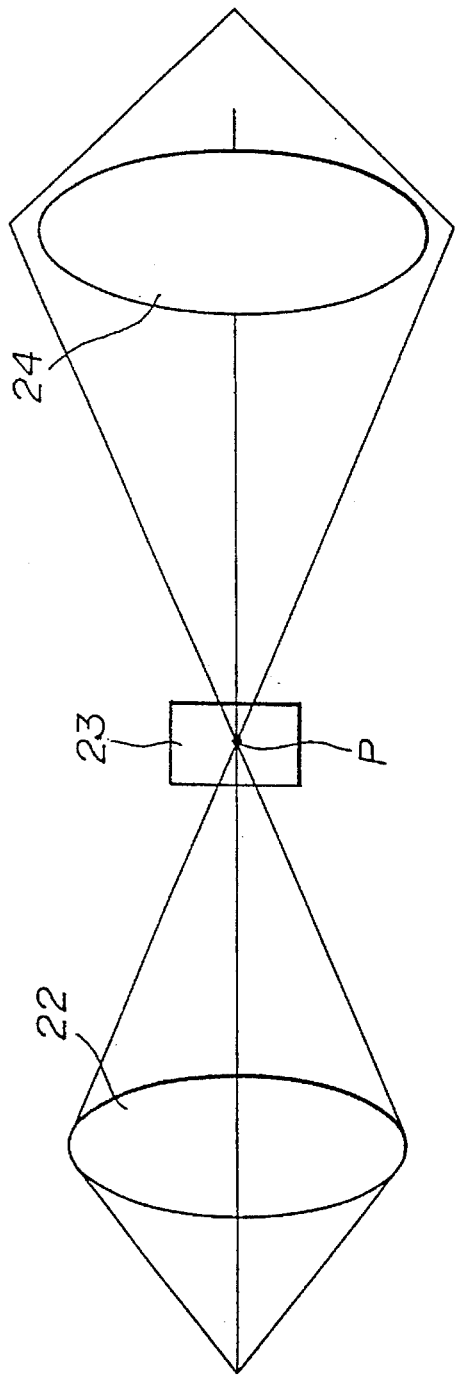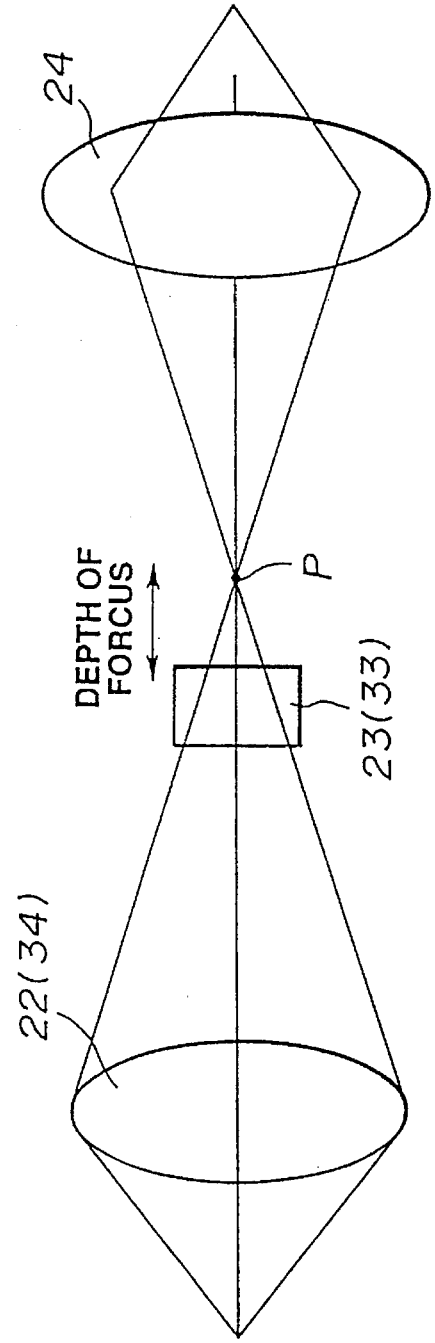
FIG.3(a)
FIG.3(b)

LASER LIGHT MODULATION METHOD AND APPARATUS FOR RECORDING DIGITAL AUDIO SIGNALS ON CINEFILM

TECHNICAL FIELD

This invention relates to a method and an apparatus for recording information which may be conveniently employed for recording the voice information on a cinefilm by optically recording the voice information on a sound track of the cinefilm, for optically recording the desired information on an optical card, or thermally recording so-called bar codes as the recording information by light on a heat-sensitive recording medium. More particularly, it relates to a method and an apparatus for optically recording or photo-thermally recording the desired information by a laser beam radiated by a laser beam radiating means.

BACKGROUND ART

Heretofore, the voice information for cinema for a movie theater is recorded on the sound track provided on a right or left edge of a picture area of the cinefilm along the film running direction.

If a light source other than a laser source, such as an LED array or a halogen lamp, is employed, the output is low, sufficient luminosity cannot be achieved, and a lot of time is consumed in recording the information. However, if the usual laser beam is employed, a speckled noise is produced in an ultimate image thus seriously deteriorating the image-forming performance. The information concerning the speckled noise may be found in "Introduction to Fourier Optics", pages 131 to 134, by Joseph W. Goodman, McGrow-Hill Book Company, 1968. On the other hand, with the coherent laser beam, the cut-off of the resolution for the spatial frequency is also reduced by one half. Consequently, a light source other than the laser light has so far been employed in the optical recording system. However, if the light source employed is of the type in which a spatial modulator is based on the polarized light produced under e.g. the electro-optical effect, it is necessary to provide polarizing plates ahead and at the back of the modulator, which detracts from the efficiency since the system is used in conjunction with a non-polarized light.

Meanwhile, for recording the information without voids, such as by a printer, the conventional practice has been to employ two staggered arrays of modulators. If a light source of a lower light output is employed for affording a homogeneous illumination on these staggered rows of modulators, it has been necessary to provide a plurality of light sources.

It is noted that the following apparatus may be contemplated as a technology of recording the digital voice on the cinefilm.

That is, the device for digital recording of the voice information includes a light source 11, made up of a plurality of light-emitting diodes 10 or halogen lamps, a first polarizing plate 12 for polarizing the light radiated from the light source 11 for re-radiating the light, a light modulator 13 for polarizing the information light in a pre-set manner for re-radiating the light and a converging lens 15 for converging the information light from the second polarizing plate 14 for directing the converged light to a sound track 16a of a cinefilm 16, as shown in FIG. 1.

The light modulator 13 has a first line of apertures or through-holes 17 and a second line of apertures or through-holes 18, each line 17 and 18 having ten apertures or through-holes 17a to 17j and 18a to 18j, respectively. The apertures 17a to 17j of the first aperture line 17 and the apertures 18a to 18j of the second aperture line 18 are positioned so that a land equal to one-aperture width is left between the neighboring apertures. Besides, the apertures 18a to 18j of the second aperture line 18 are disposed directly below the lands between the apertures of the first aperture line 17. That is, the apertures 17a to 17j of the first aperture line 17 are placed in a staggered relation with respect to the apertures 18a to 18j of the first aperture line 18.

With the above-described information recording apparatus, when the recording of the voice information is started, the cinefilm starts to be taken up, at the same time that the light-emitting diodes 10 are illuminated to radiate the light from the light source 11. This light is radiated on the polarizing plate 12.

Since this radiated light is the natural light, the first polarizing plate 12 translates the radiated light into a linearly polarized light which is then radiated to the apertures 17a to 17j and 18a to 18j of the light modulator 13.

The light modulator 13 is driven responsive to the voice information entered via an input terminal 19 to modulate the direction of polarization of the linearly polarized light transmitted through the apertures 17a to 17j and 18a to 18j under the so-called electro-optical effect for translating the voice information in the form of electrical signals into signals in the form of the directions of spatial polarization which are then radiated on the second polarizing plate 14.

The second polarizing plate 14 translates the non-polarized light component, generated by the modulation of the direction of polarization by the modulator 13, into the linearly polarized light, which is then radiated on the converging lens 15.

The converging lens 15 converges and radiates both the linearly polarized light from the apertures 17a to 17j of the first aperture line 17, which has been converted into signals of the spatial light intensity, and the linearly polarized light from the apertures 18a to 18j of the second aperture line 18, which has similarly been converted into signals of the spatial light intensity, on the sound track 16a of the cinefilm 16.

The cinefilm 16 starts to be taken up when the recording of the voice information is started as described above. The apertures 17a to 17j of the first aperture line 17 and the apertures 18a to 18j of the second aperture line 18 are arrayed in a staggered relation to each other. Consequently, the entire voice information is recorded on the sound track 16a in such a manner that the voice information recorded by the linearly polarized light from the apertures 18a to 18j of the second aperture line 18 is stuffed in the void areas between the voice information recorded by the linearly polarized light from the apertures 17a to 17j of the second aperture line 17. That is, the voice information recorded by the linearly polarized light from the apertures 17a to 17j of the first aperture line 17 and the voice information recorded by the linearly polarized light from the apertures 18a to 18j of the second aperture line 18 are alternately recorded on one and the same line on the sound track 16a.

In this manner, a row of the voice information is recorded without gaps in the sound track.

However, since an array of LEDs or a halogen lamp is employed as a light source in the above-described conventional information recording device, an output of the light source is low, a sufficient luminosity cannot be developed, and a lot of time is consumed in recording the voice information.

Besides, since the LED array or the halogen lamp is employed as the light source in the above-described information recording device, it is necessary to provide polarizing plates ahead and at the back of the light modulator 13 for translating the non-polarized light into the linearly polarized light in recording the voice information, with the result that the number of components, such as the first and second polarizing plates 12, 14, is increased and the structure becomes complicated to raise production costs.

On the other hand, the use of the first and second polarizing plates 12, 14 for polarization may be said to be responsible at least partially for the low light output of the light source and insufficient luminosity.

In addition, with the above-described recording of the voice information in which the voice information is recorded without voids or gaps using the light modulator 13 having the apertures 17a to 17j of the first aperture line 17 and the apertures 18a to 18j of the second aperture line 18 arranged in a staggered relation to each other, it is necessary to provide a plurality of light sources 51 for uniformly irradiating the aperture lines 17, 18 with the light from the light source, with the result that again the number of components, such as the first and second polarizing plates 12, 14, is increased and the structure becomes complicated to raise production costs.

For overcoming the above-described inconveniences, a semiconductor laser light capable of outputting a laser light beam as a linearly polarized light of higher luminosity may be employed as the light source. However, if a laser beam is radiated on the sound track 16a of the cinefilm 16 using a conventional semiconductor laser, the speckled noise is incurred when the voice is recorded on the sound track 16a of the cinefilm 16. Besides, the cut-off of the resolution of the spatial frequency is decreased by about one half with the coherent laser light beam radiated from the semiconductor laser.

In view of the above-depicted inconveniences of the prior art, it is a principal object of the present invention to provide a method and apparatus for recording the information in which the recording may be made in a shorter time and at low cost by a simplified arrangement employing a smaller number of component parts such as the polarizing plates and in which, even with the use of the light modulator provided with plural aperture lines, these aperture lines may be irradiated uniformly by the radiated light.

DISCLOSURE OF INVENTION

With the information recording method according to the present invention, a laser beam radiated on spatial modulating means for being modulated in accordance with the information to be recorded is a laser beam radiated from laser beam radiating means having a wide radiating area for equalizing the luminosity of the laser beam radiated thereby for being illuminated on the spatial modulating means.

The information recording method according to the present invention radiates a laser beam radiated from laser beam radiating means having a wide radiating area on spatial modulating means driven in accordance with the information to be recorded for equalizing the luminosity of the laser beam radiated thereby for being illuminated on the spatial modulating means. The desired information may be recorded by the spatial modulating means on the recording medium by illuminating the laser beam on the recording medium.

The information recording apparatus according to the present invention includes a plurality of aperture lines each of which is made up of a plurality of apertures for transmitting the laser beam for enabling recording of the information in an amount equal to a plurality of number of times at a time.

Besides, with the information recording apparatus according to the present invention, refracted light re-radiating means is provided between the laser beam radiating means and the spatial modulating means for re-radiating the diffracted light, the number of orders of which is selected to be equal to the number of the aperture lines provided in the spatial modulating means for reducing the number of the light sources.

With the information recording apparatus according to the present invention, the above-mentioned spatial modulating means is provided within the depth of focus of the laser beam, with the focal point of the laser beam being located between the spatial modulating means and the recording medium for inhibiting the speckled noise.

With the information recording apparatus according to the present invention, the laser beam re-radiated by the spatial modulating means is illuminated on the sound track of the cinefilm for recording the desired information on the sound track.

Also, with the information recording apparatus according to the present invention, the apertures of an upper one and a lower one of said aperture lines are staggered with respect to one another for achieving high-density information recording.

BRIEF DESCRIPTION OF THE DRAWINGS

FIGS. 3(a) and 3(b) are schematic views for illustrating the position of the focal point of a laser beam in the voice recording device of the first embodiment shown in FIG. 2 and the position of the focal point of a laser beam in the voice recording device of a second embodiment according to the present invention, respectively.

BEST MODE FOR CARRYING OUT THE INVENTION

Figure 1:
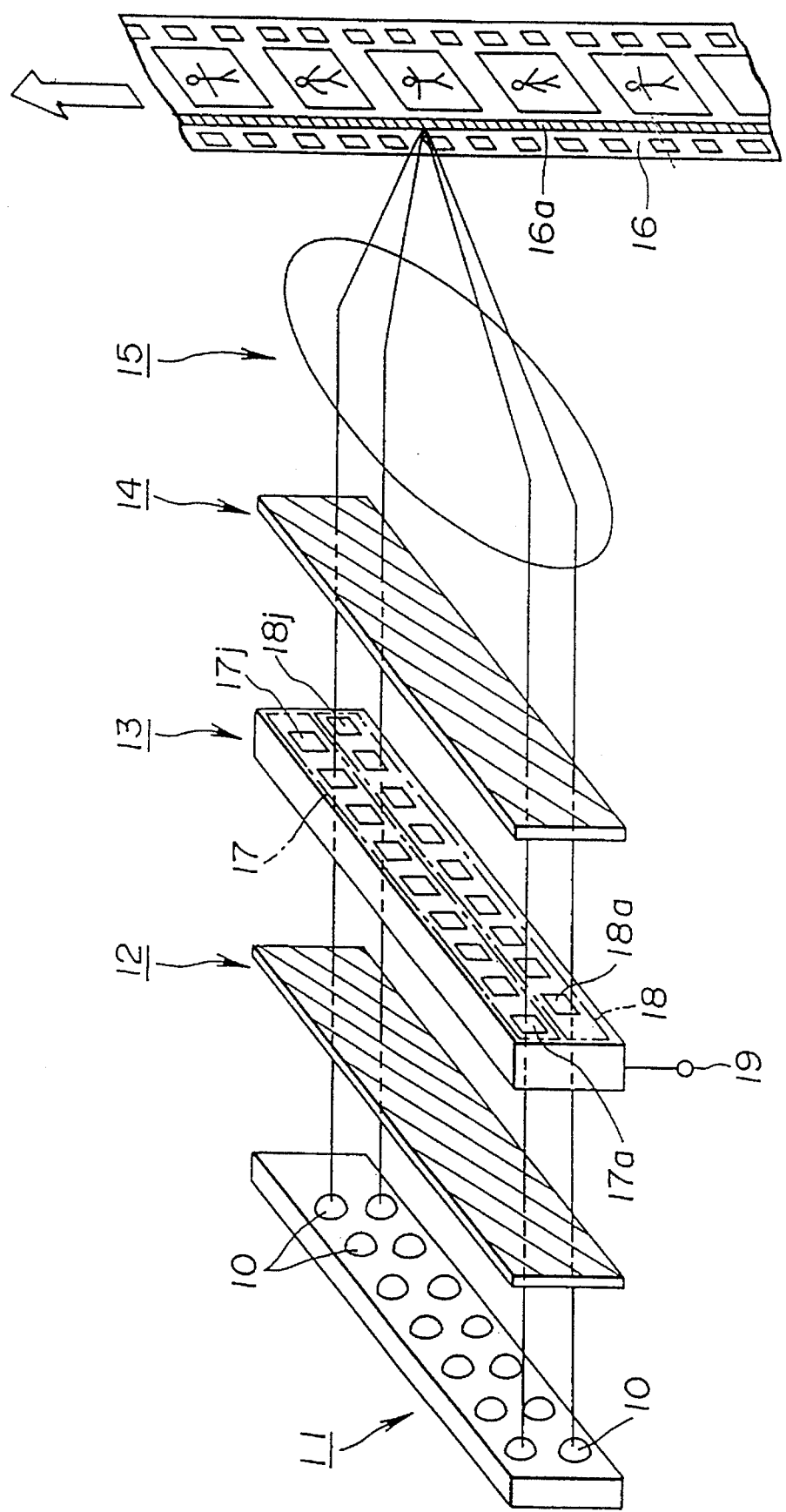
FIG. 1 is a schematic perspective view showing the construction of an information recording device for digitally recording voice information.

Referring to the drawings, preferred illustrative embodiments of the method and apparatus for recording the information according to the present invention will be explained in detail.

The method and apparatus for recording the information according to the present invention may be applied to an apparatus for recording the voice on a cinefilm by optical recording.

Figure 2:
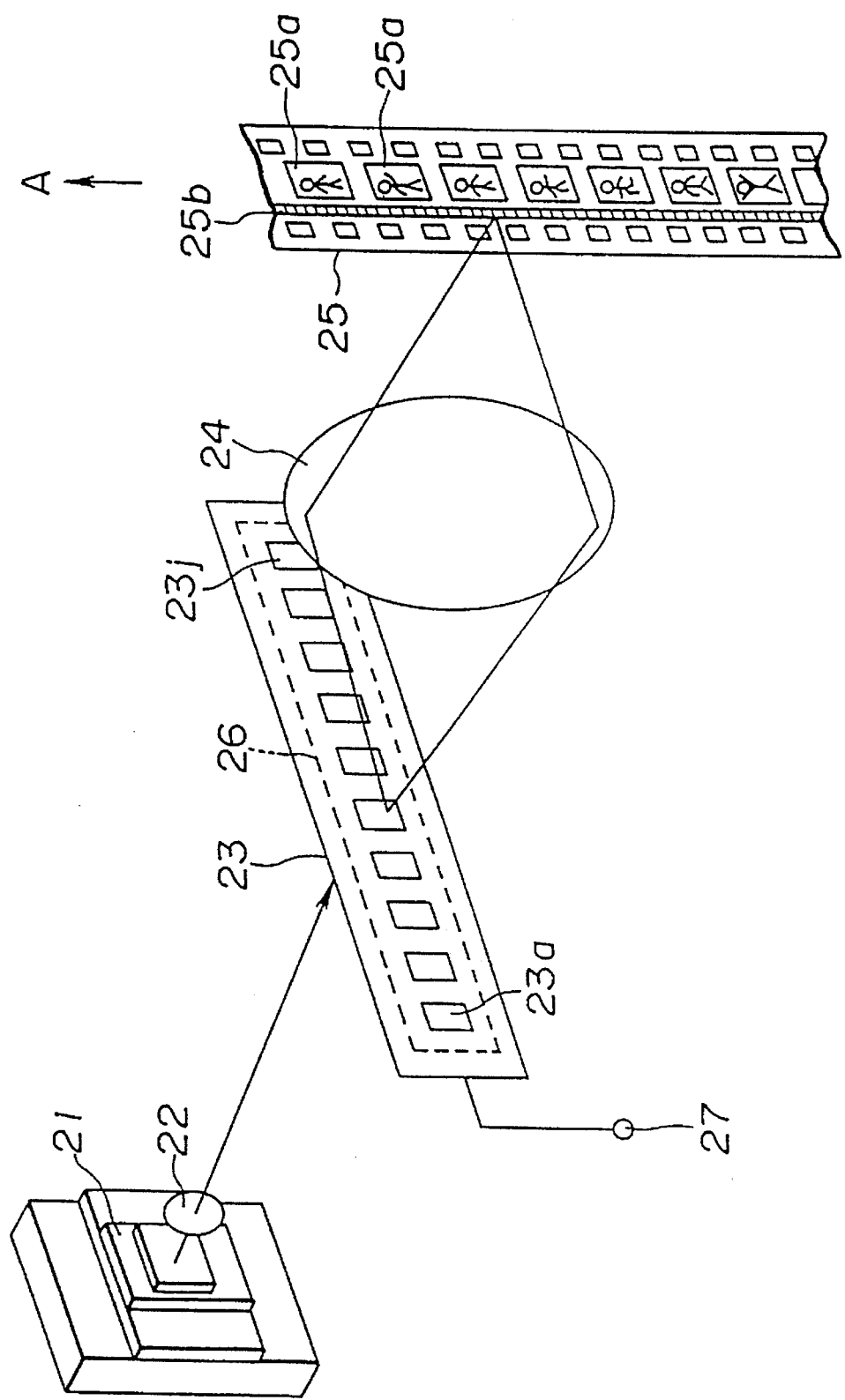
FIG. 2 is a schematic perspective view showing a voice recording device for cinema according to a first embodiment of the present invention.

The voice recording apparatus for cinema is made up of a semiconductor laser 21 as means for radiating a laser beam, a magnifying lens 22 for magnifying the laser beam from the semiconductor laser 21 to a suitable size, a light modulator 23 driven responsive to voice data as desired data, and an image-forming lens 24 for converging the laser light on a cinefilm 25 as a recording medium, as shown in FIG. 2. The light modulator 23 acts as spatial modulating means irradiated with the laser beam magnified by the magnifying lens 22.

As the semiconductor laser 21, a laser diode manufactured and sold by SONY CORPORATION under the trade name of SLD-XT1301, having a wide area of light radiation and capable of radiating a laser beam of low spatial coherency and high output in a direction parallel to the junction, may for example be employed. The area of light radiation is dimensioned to cover the area of the light modulator 23 required to be irradiated. On the other hand, since too high a coherency in the laser beam produces a speckled noise in the reproduced voice, the laser beam of such coherency as not to produce the speckled noise is employed. The output level of the laser beam is selected so as to permit the voice data to be recorded on the cinefilm 25 during a time duration as occasionally required.

In this manner, there is no risk of the speckled noise being incurred on the cinefilm 25, while the cut-off of the resolution of the spatial frequency may also be optimized.

The light modulator 23 has an aperture line 26 consisting of a row of ten apertures 23a to 23j, and is adapted for being driven responsive to the voice data.

The sound track 25b is formed for extending laterally of and along the proceeding direction of the cinefilm 25. The sound track 25b is formed of a photosensitive recording medium which is sensitized by the laser beam for recording the voice data.

On the other hand, if a focal point P of the laser beam is formed within the aperture of the light modulator 23, as shown in FIG. 3(a), there is generated a laser beam which is radiated outside of the image-forming lens 24. For this reason, the light modulator 23 is provided within a depth of focus of the laser beam, while the focal point P of the laser beam is located intermediate between the light modulator 23 and the cinefilm 25, as shown in FIG. 3(b), In this manner, the laser beam transmitted through the light modulator 23 may be radiated on the magnifying lens without leakage so as to be radiated by the magnifying lens on the cinefilm. This enables the laser beam to be utilized efficiently to prevent the speckled noise from being produced.

The operation of the voice recording apparatus for cinema according to the above-described first embodiment of the present invention will be explained.

When the recording of the voice data is started, the cinefilm 25 is taken up in a direction shown by an arrow A in FIG. 2. A laser beam is radiated from the semiconductor laser 1, at the same time that the voice data is supplied via an input terminal 27 to the light modulator 23.

The laser beam radiated from the semiconductor laser 21 is illuminated on the magnifying lens 22.

The magnifying lens 22 re-radiates the laser beam with an enlarged area. As a result thereof, the laser beam re-radiated by the magnifying lens 22 is illuminated uniformly on the apertures 23a to 23j of the light modulator 23 in their entirety.

The light modulator 23 allows the laser beam radiated on the apertures 23a to 23j to be transmitted therethrough. At this time, the laser beam transmitted through the apertures 23a to 23j is changed in phase depending on the voice data supplied thereto via the input terminal 27 for modulating the intensity of the laser beam. That is, the light modulator 23 translates the electrical voice data into signals having the spatial light intensities under the so-called electro-optical effect. The laser beam in the form of the light intensity signals is radiated on the image-forming lens 24.

The voice data supplied to the light modulator 23 has its amplitude, such as the current or voltage amplitude, adjusted for each of the apertures 23a to 23j so that the laser light re-radiated from the apertures 23a to 23j is of a uniform light volume. In this manner, the laser beam radiated from the apertures 23a to 23j of the light modulator 23 is of a uniform light volume.

Meanwhile, the effects similar to those mentioned above may be obtained by changing the pulse width of the voice data depending on the apertures 23a to 23j.

Such effects may also be realized by providing a spatial filter in an optical path which has such transmittance distribution as to assure the uniform light volume transmitted through the apertures 23a to 23j. The spatial filter which changes the state of polarization or the volume of the transmitted light may be employed.

If the light modulator based on the electro-optical effects, such as polarization, is employed as the light modulating means, the polarizing plates need to be provided ahead and at the back of the light modulator 23. However, since the above-mentioned semiconductor laser 21 employed as a light source in the voice recording apparatus for cinema according to the present invention radiates the laser beam which is the linearly polarized light, there is no necessity of providing the polarizing plates, as a result of which the number of components may be reduced to simplify the construction to diminish production costs.

Besides, since there is no necessity of providing the polarizing plates, the output level of the laser beam is not diminished, the voice data recording time as later explained my be shortened.

The image-forming lens 24 directs an image responsive to the laser beam radiated thereto via the apertures 23a to 23j of the light modulator 23 to the sound track 25b of the cinefilm 25.

The imaging lens may be replaced by recording means, such as holographic recording means.

The sound track 25b is formed of a photosensitive recording medium, and is sensitized by the laser beam radiated thereon via the image-forming lens 24. Since the laser beam is light-modulated by the ten apertures 23a to 23j of the light modulator 23 in accordance with the desired voice data, the desired voice data is optically recorded on the sound track 25b as voice data in a row consisting of a plurality of, herein ten bits, extending in a direction perpendicular to the proceeding direction of the cinefilm 23.

The method and apparatus for recording the information, as applied to the cinema voice recording apparatus, is hereinafter explained as a second embodiment of the present invention.

In the present second embodiment, the parts or components which are similar to those of the first embodiment are indicated by the same reference numerals.

Figure 4:
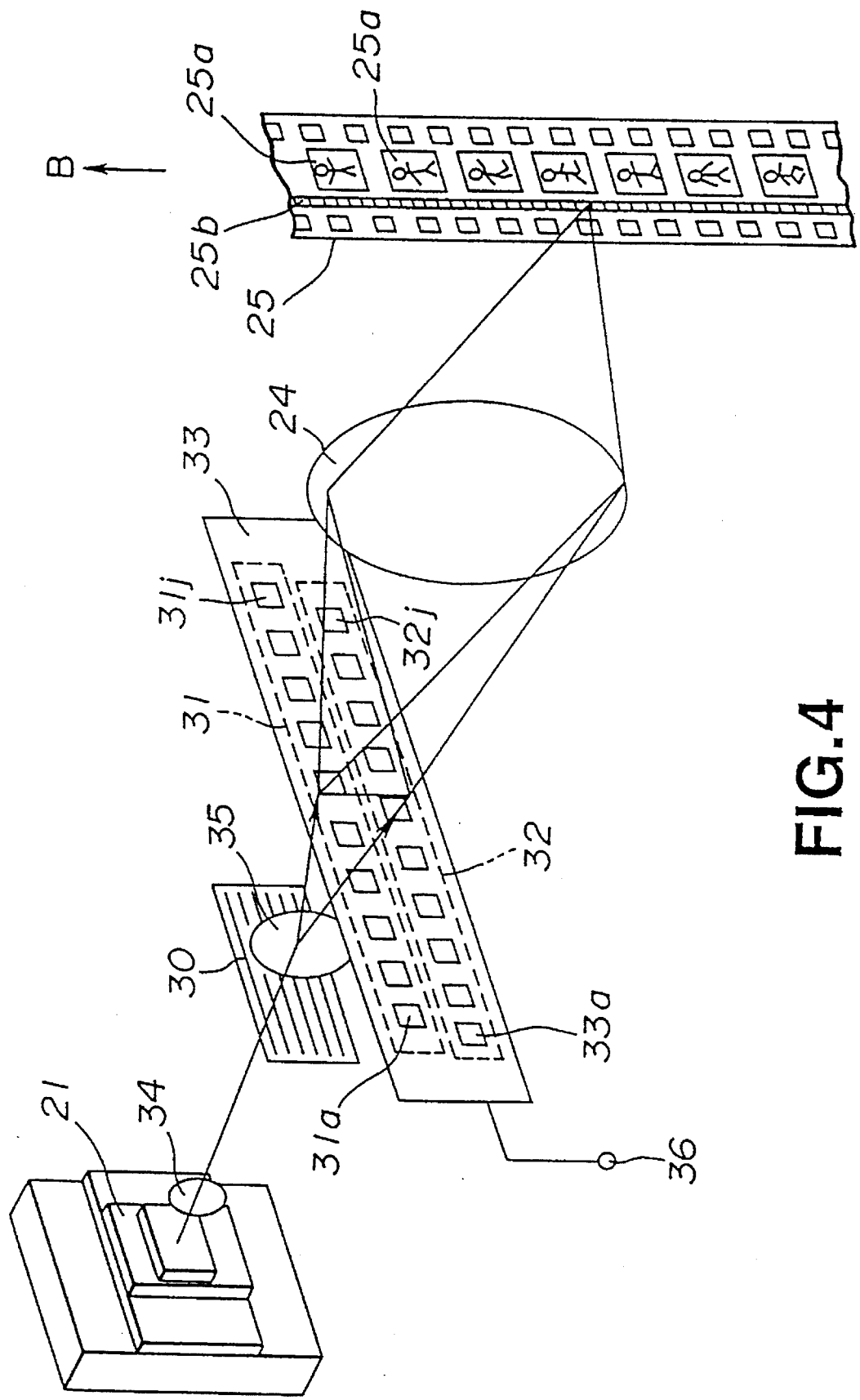
FIG. 4 is a schematic perspective; view showing the voice recording device for cinema according to the second embodiment of the present invention.

The voice recording apparatus for cinema according to the second embodiment is made up of the above-mentioned semiconductor laser 21, a collimator lens 34 for collimating a laser beam radiated from the semiconductor laser 21, a diffraction lattice 30, as diffracted light re-radiating means, for forming and re-radiating first and second laser beams from the laser beam emanating from the collimator lens 34, a light modulator 33 having a first aperture line 31 irradiated with the first laser beam and a second aperture line 32 irradiated with the second laser beam, a cylindrical lens 35 for radiating the first and second laser beams on the first and second aperture lines 31 and 32, respectively, and the above-mentioned image-forming lens 24, as shown in FIG. 4.

The first aperture line 31 and the second aperture line 32 of the light modulator 33 are made up of ten apertures 31a to 31j and ten apertures 32a to 32j, respectively.

The apertures 31a to 31j of the first aperture line 31 and the apertures 32a to 32j of the second aperture line 32 are formed so that an interval or a void equal to one aperture is left between the neighboring apertures. Besides, the apertures 32a to 32j of the second aperture line 32 are located directly below the apertures 31a to 31j of the first aperture line 31, respectively. That is, the apertures 31a to 31j of the first aperture line 31 and the apertures 32a to 32j of the second aperture line 32 are arranged in a staggered relation to one another.

The operation of the voice recording apparatus for cinema according to the above-described second embodiment of the present invention will be explained.

When the recording of the voice data is started, the cinefilm 25 is taken up in a direction shown by an arrow B in FIG. 4. A laser beam is radiated from the semiconductor laser 1, at the same time that the voice data is supplied via an input terminal 36 to the light modulator 33.

The laser beam radiated from the semiconductor laser 21 is illuminated on the collimator lens 34.

The collimator lens 34 collimates the laser beam into a parallel beam which is illuminated on the diffraction lattice 30.

With the voice recording apparatus for cinema according to the present second embodiment, the position of an image of a light-radiating end face of the semiconductor laser 1 by the collimator leans 34 is adjusted so as to be shifted towards the collimator lens 34 within the depth of focus of the collimator lens 34, as in the case of the voice recording apparatus according to the previous first embodiment shown in FIG. 3(b). In this manner, the laser beam transmitted through the light modulator 33 as later explained is transmitted through the light modulator 33 as a converging light so as to be converged at the focal point P. Since the laser beam is of low coherency, the speckled noise may be prevented from being produced if the laser beam is converged substantially within the depth of focus. This means that the angle of field with respect to the imaging lens 24 is reduced. Consequently, the reflection of the laser beam within the image-forming lens 24 as well as the deterioration in the light volume and increase in aberration due to the image formation outside the optical axis may be diminished to improve the image-forming performance.

Figure 5A:
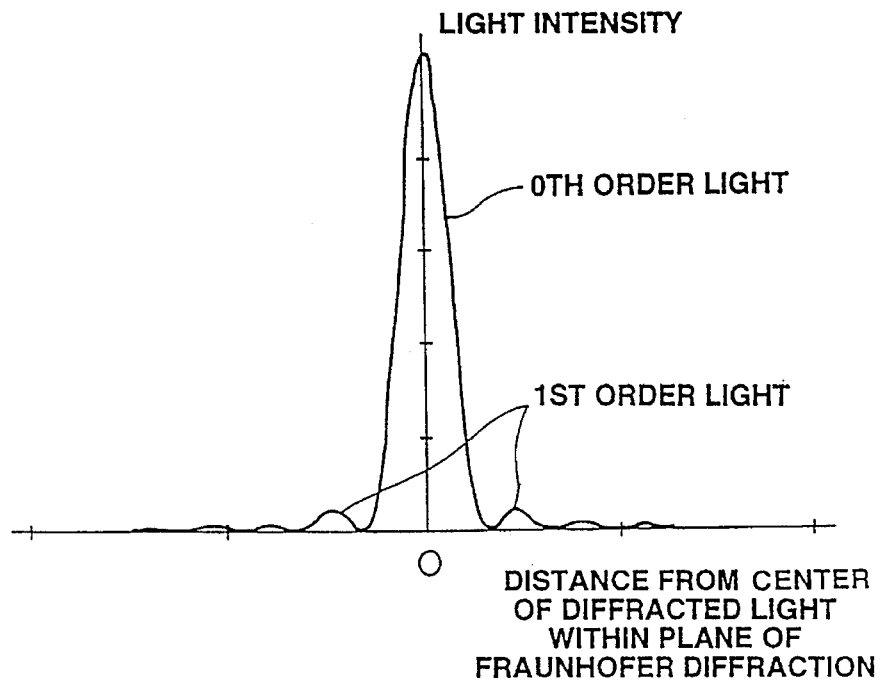
FIG. 5(a) is a graph showing the diffracted light radiated from a diffraction lattice provided in the voice recording device for cinema according to the second embodiment.
Figure 5B:
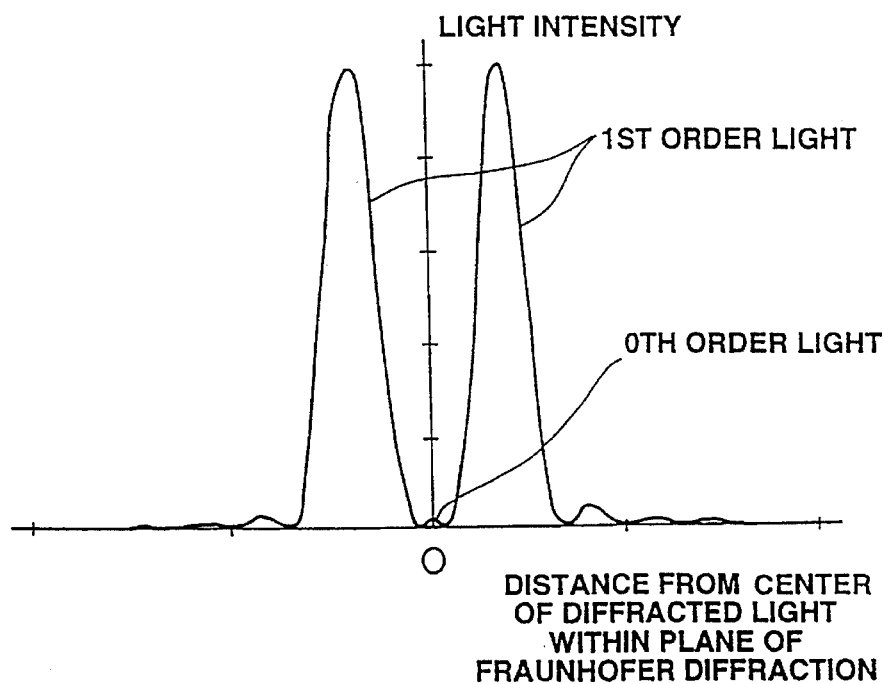
FIG. 5(b) is a graph-showing the diffracted light radiated from a diffraction lattice provided in the voice recording device for cinema according to the second embodiment.

The usual diffraction lattice radiates the diffracted light of the 0'th order with the strongest intensity, while radiating the diffracted light of the higher orders with the lesser intensity, as shown in FIG. 5(a). The diffraction lattice 30 employed in the voice recording apparatus for cinema according to the second embodiment is adjusted for radiating the diffracted light of the ±1st order with the strongest intensity, as shown at (b) in FIG. 5. Thus the diffraction lattice 30 forms the first and second laser beams, which are diffracted light of the ±1st order, from the laser beam radiated thereto via the collimator lens 34, and re-radiates the first and second laser beams on the cylindrical lens 35.

Figure 6:
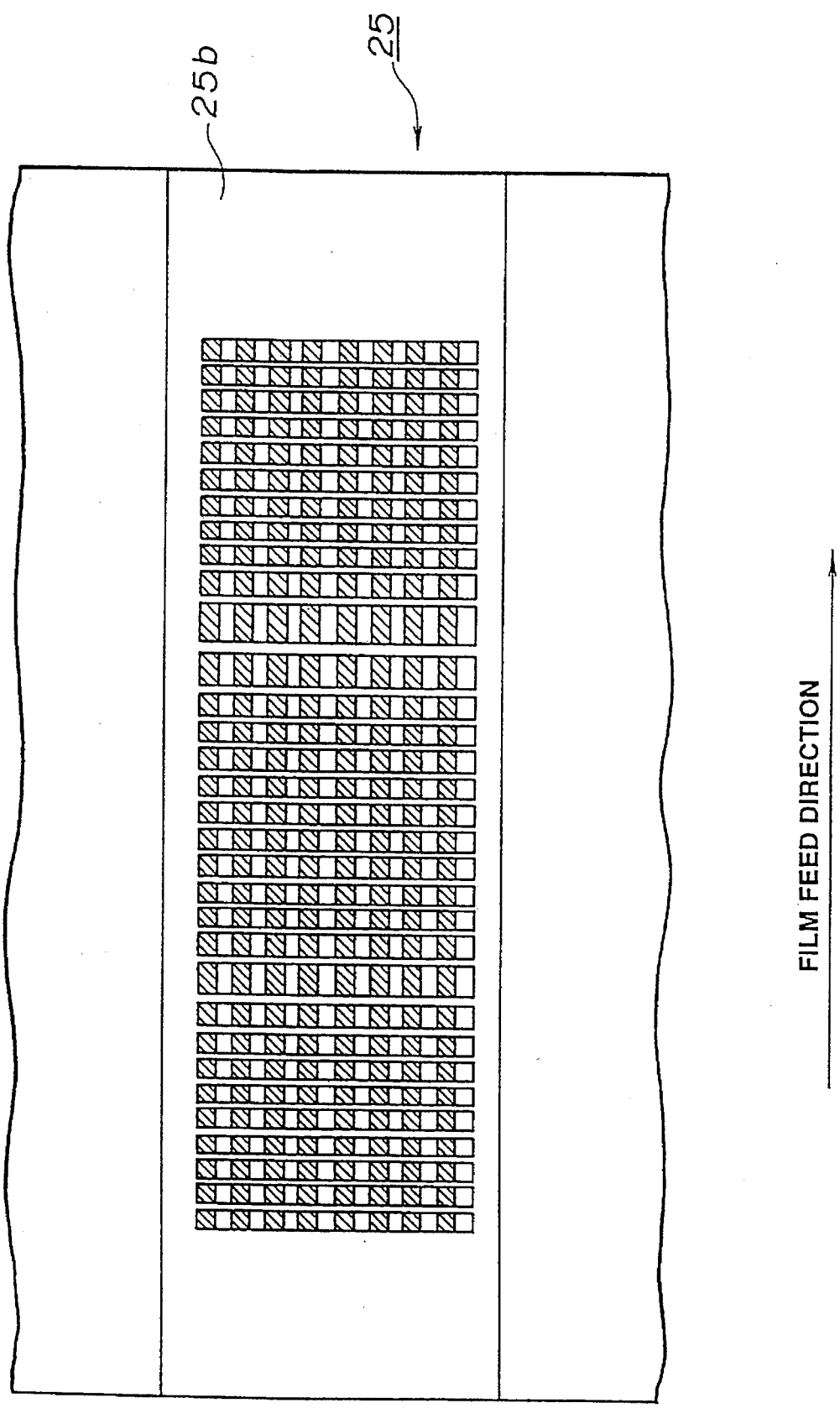
FIG. 6 is a plan view of a cinefilm showing the voice data recording format by the voice recording device for cinema according to the second embodiment.

The cylindrical lens 35 changes the optical paths of the first and second laser beams transmitted therethrough so that the first and second laser beams from the cylindrical lens 35 are illuminated with a small angle of incidence on the first and second aperture lines 31 and 32 of the light modulator 33, as shown in FIG. 6.

The laser beams are illuminated on and transmitted through the apertures 31a to 31j of the aperture line 31 and the apertures 32a to 32j of the aperture line 32 of the light modulator 33. At this time, the laser beams transmitted through the apertures 31a to 31j and 32a to 32j are changed in phase depending on the voice data supplied thereto via the input terminal 36 for modulating the intensity of the laser beam. That is, the light modulator 33 translates the electrical voice data into signals of the spatial light intensities under the so-called electro-optical effect. Besides, the light modulator drives the first and second aperture lines 31, 32 with a pre-set time difference depending on the voice data. The result is that the first and second laser beams are radiated alternately with the above-mentioned time difference from each other. The first and second laser beams, thus translated into signals in the form of the variable light, intensities, are illuminated on the image-forming lens 24.

The voice data supplied to the light modulator has its amplitude (that of the voltage or current) adjusted for each of the apertures 31a to 31j and 32a to 32j so that the light volumes of the first and second laser beams re-radiated from the apertures 31a to 31j and 32a to 32j will be constant. In this manner, the light volumes of the first and second laser beams re-radiated from the apertures 31a to 31j and 32a to 32j may be rendered uniform.

The similar effects may be achieved by changing the pulse width of the voice data depending on the apertures 31a to 31j and 32a to 32j.

The similar effects may also be achieved by placing in the optical path a spatial filter which has the light transmittance distribution so selected as to render the light volume transmitted through the apertures 31a to 31j and 32a to 32j uniform, that is a spatial filter which causes the state of polarization or the amount of light transmission to be changed.

If the light modulating means based on light polarization, inclusive of the electro-optical effects, such as the light modulator 33, is employed, it becomes necessary to provide polarizing plates ahead and at back of the light modulator 33. With the voice recording apparatus for cinema according to the present embodiment, since the semiconductor laser 1 radiating the laser beam as the linearly polarized light is employed as the light source, there is no necessity of providing the polarizing plates, with the result that the number of components may be reduced to simplify the structure to reduce production costs.

Besides, since there is no necessity of providing the polarizing plates, the output level of the laser beam is not diminished. Consequently, the recording time may be shortened, as later explained.

The image-forming lens 24 causes an image responsive to the first and second leaser beams radiated thereon via the apertures 31a to 31j and 32a to 32j of the light modulator 33 to be illuminated on the sound track 25b of the cinefilm 25.

The first and second-laser beams are radiated alternately, and the cinefilm 25 is run by being taken up at a pre-set speed, such that the second laser beam is radiated on the same row of the voice data recorded by the radiation of the first laser beam. However, since the apertures 31a to 31j and 32a to 32j of the light modulator 33 are arranged in a staggered relation as mentioned above, voice data recording is made in such a manner that the voice data recorded by the second laser beam via the apertures 32a to 32j of the second aperture line 32 is stuffed between the voice data recorded by the first laser beam via the apertures 31a to 31j of the first aperture line 31. Although the voice data by the first laser beam and the voice data by the second laser beam are illuminated on the same row, the voice data, composed herein of 20 bits, are recorded in each row in a direction perpendicular to the running direction of the cinefilm 25 without gaps and without data overlap; thereby achieving high density recording, as shown in FIG. 6.

On the other hand, since the voice data may be recorded in two sections, the recording time may be shortened with the voice recording apparatus for cinema according to the present second embodiment than with the voice recording apparatus for cinema according to the first embodiment.

Other recording means, such as holographic recording means, may be provided in place of the above-mentioned image-forming lens.

Besides, the sound track may also be provided on each side of the picture area 5a and associated with the voice recording apparatus of the second embodiment so that the laser beam radiated from each voice recording apparatus for cinema is illuminated on each of the two sound tracks for recording a double amount of the voice data.

It is noted that the first and second laser beams from the diffraction lattice 30 are caused to fall on the light modulator 33 by the cylindrical lens 35 at a small angle of incidence, as described above. As a result thereof, the laser beam is incident on the light modulator 33 at a small angle of incidence, so that reflection within the light modulator 33, stray light or birefringence, responsible for deteriorating the light volume, may be diminished. On the other hand, both the height of incidence and the angle of incidence of the laser beams to the imaging lens 24 may also be reduced.

Figure 7:
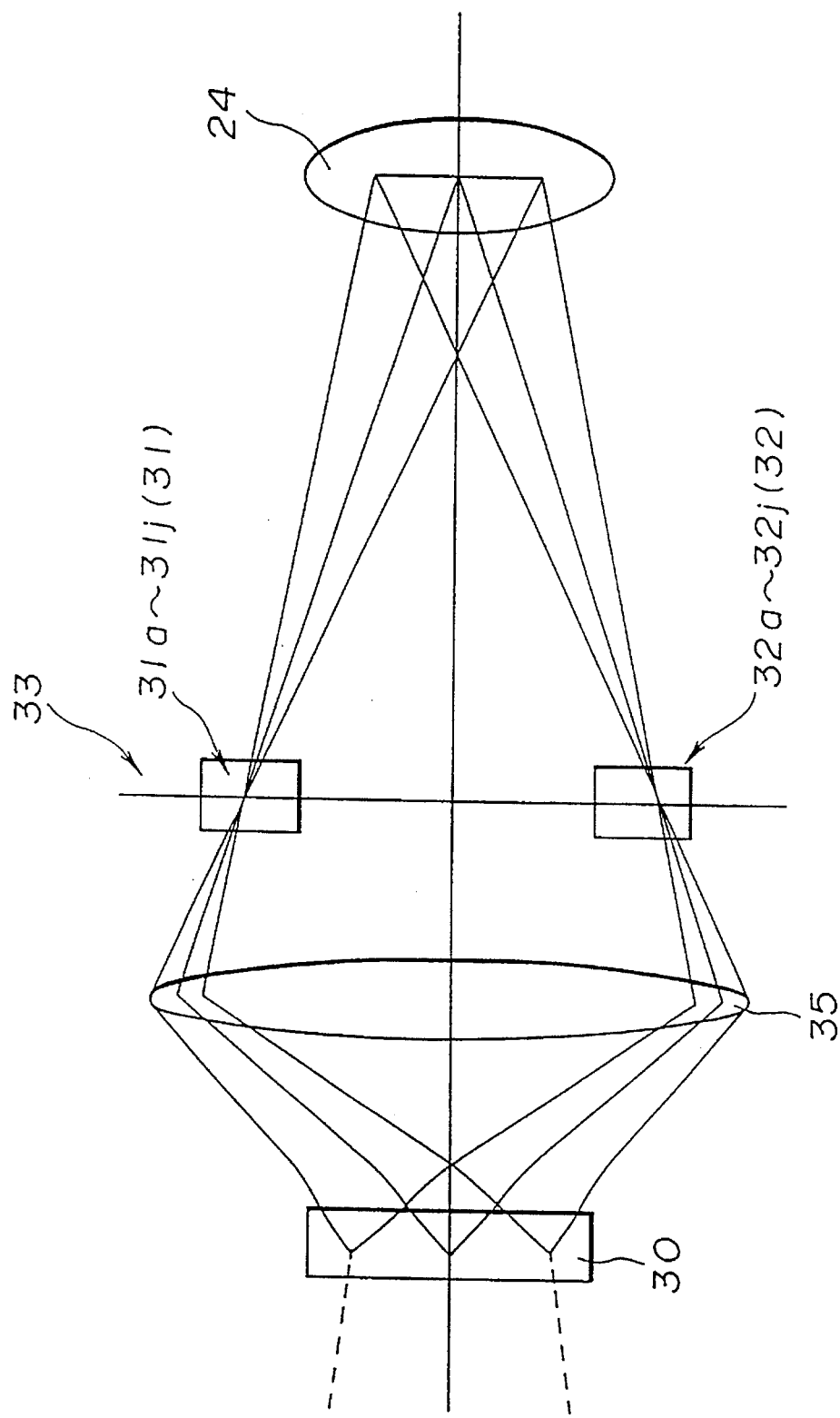
FIG. 7 is a schematic view for illustrating the relative disposition of a diffraction lattice, a cylindrical lens, a light modulator and an image-forming lens provided in the voice recording device for cinema according to the second embodiment.

Specifically, the incident light volume on the image-forming lens 24 may be maximized by causing an image of the diffraction lattice 30 to be formed at a point of intersection with the optical axis of an entrance pupil of the imaging lens 24, as shown in FIG. 7. That is, the cylindrical lens 35 is provided at such a position that the diffraction lattice 30 and the entrance pupil to the image-forming lens 24 will be conjugate relative to each other. In this manner, the reflection within the image-forming lens 24 may be minimized.

Figure 9:
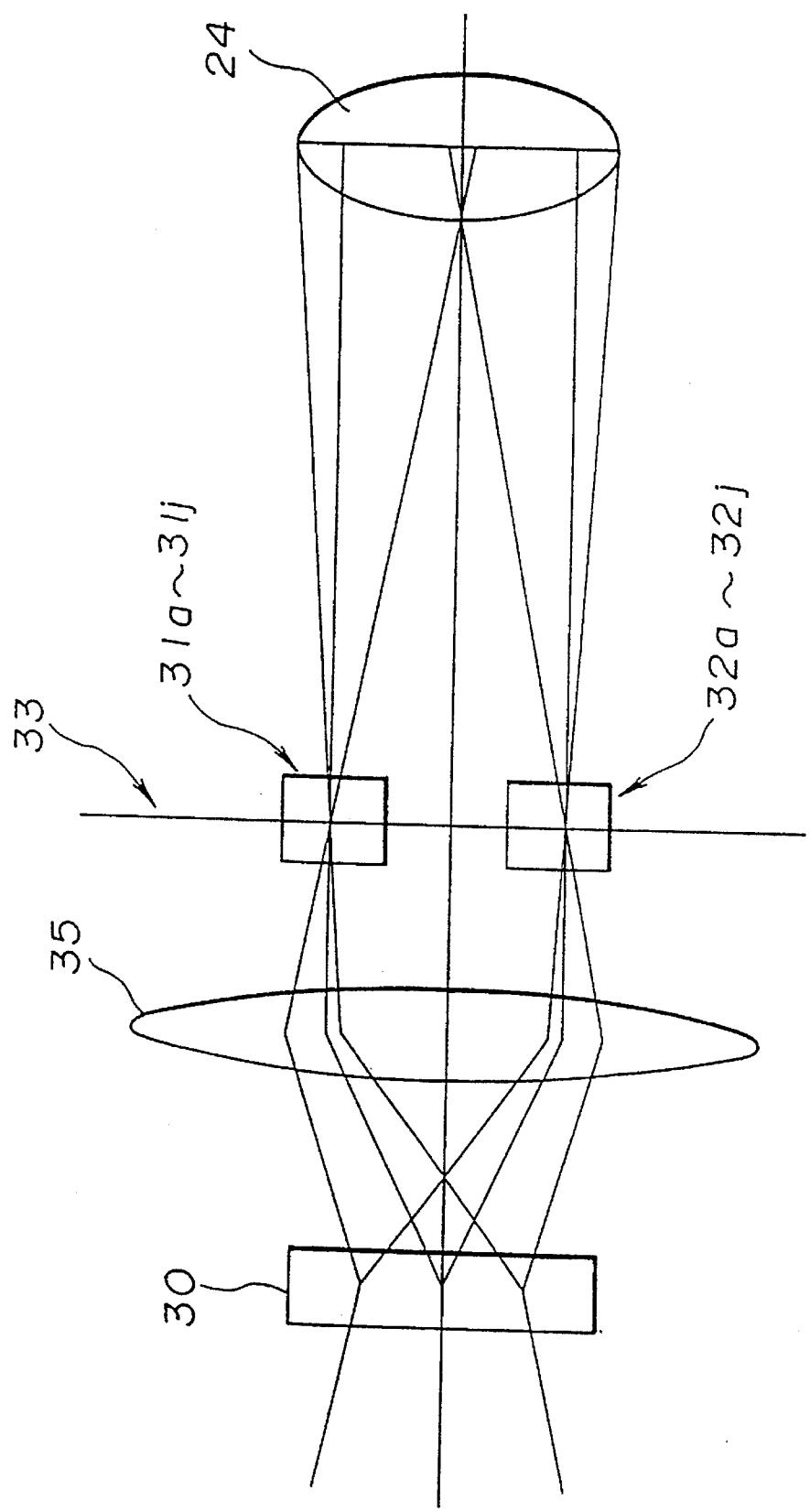
FIG. 9 is a schematic view for illustrating another example of the relative disposition of a diffraction lattice, a cylindrical lens, a light modulator and an imaging lens provided in the voice recording device for cinema according to the second embodiment.

Besides, the angle of incidence of the laser beam to the light modulator 33 may be minimized by placing the diffraction lattice 30 at a focal point of the cylindrical lens 35 and by collimating the laser beam, as shown in FIG. 9. In this manner, the image-forming performance may be prevented from being deteriorated under the effects of birefringence or the stray light within the light modulator 33 or the image-forming lens 24.

Figure 8:
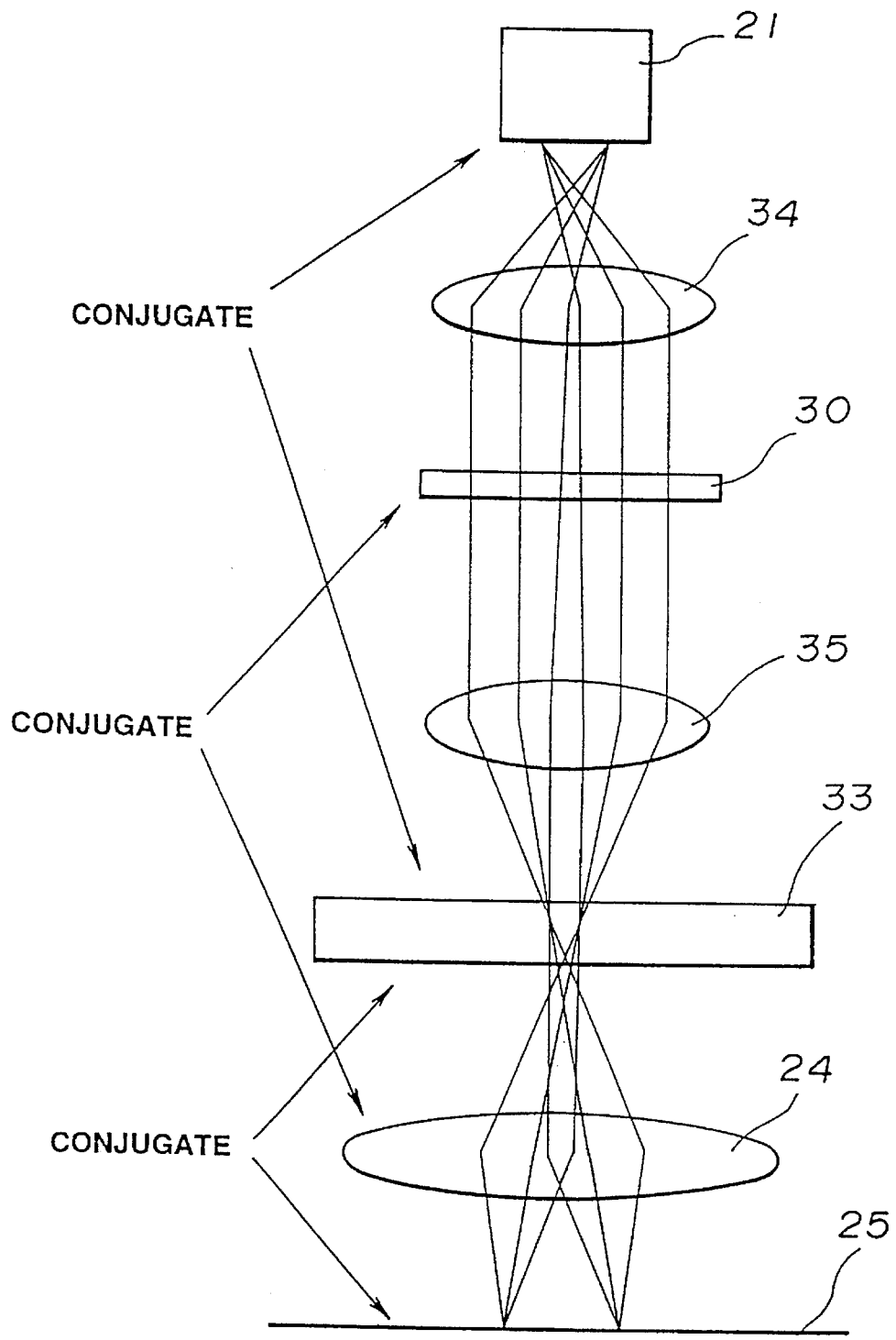
FIG. 8 is a schematic view for illustrating the relative disposition of a diffraction lattice, a cylindrical lens, a light modulator and an imaging lens provided in the voice recording device for cinema according to the second embodiment in further detail.

The cylindrical lens 35 may also be placed intermediate between the positions shown in FIGS. 8 and 9 for optimizing the image-forming performance.

Since the voice recording apparatus for cinema according to the present invention renders it possible to improve the image-forming performance in this manner, it becomes possible to reduce the recording time for recording the voice data.

It is to be noted that the basic technical concept of the information recording apparatus according to the present invention resides in recording the desired information by translating the laser beam emanating from a laser beam radiating means having a wide range of light radiation into the light information by spatial modulating means and by illuminating the light information on a recording medium which is responsive to the intensity or heat of the light. Consequently, the present invention is not limited to the construction of the above-described embodiments, and a latitude of variations may be made within the above-defined technical concept such as by recording the desired information on an optical card or by thermally recording bar codes on a heat-sensitive paper under the effect of the heat of light rays.

We claim:

1. A method for recording information on a recording medium using a laser beam comprising the step of:

radiating a laser beam on the recording medium via spatial modulating means for recording desired information on said recording medium, said spatial modulating means being adapted for performing light modulation of the laser beam depending on the information desired to be recorded on the recording medium, wherein said spatial modulating means is provided within a depth of focus of said laser beam.

2. An apparatus for recording information using a laser beam comprising:

laser beam radiating means having a laser beam radiating area; and spatial modulating means for modulating the laser beam radiated from said laser beam radiating means in accordance with the information to be recorded on the recording medium, and re-radiating the modulated laser beam, said laser beam radiating area being dimensioned to cover an area of the spatial modulating means required to be irradiated, and said laser beam being re-radiated from said spatial modulating means for illumination of said recording medium for recording the information on said recording medium.

3. The apparatus according to claim 1 wherein said spatial modulating means comprises a plurality of aperture lines each made up of a plurality of apertures for transmitting said laser beam therethrough.

4. The apparatus according to claim 2 further comprising diffracted light re-radiating means between said laser beam radiating means and said spatial modulating means, the number of orders of the diffracted light of said diffracted light re-radiating means being equal to the number of the aperture lines provided in said spatial modulating means.

5. The apparatus according to claim 2 wherein said spatial modulating means is provided within a depth of focus of said laser beam, the focal point of which is intermediate between said light modulating means and said recording medium.

6. The apparatus according to claim 2 wherein said recording medium is a cinefilm and wherein the laser beam re-radiated by said spatial modulating means is illuminated on an audio recording area of said cinefilm for recording desired music information for forming a sound track.

7. The apparatus according to claim 6 wherein said sound track is formed by digital code data.

8. The apparatus according to claim 3 wherein said apertures of an upper one and a lower one of said aperture lines are staggered with respect to one another.

9. The apparatus according to claim 2 wherein said recording medium is an optical card and wherein the laser beam re-radiated by said spatial modulating means is illuminated on an information recording area of the optical card for recording the desired information.

10. The apparatus according to claim 2 wherein said recording medium is a heat-sensitive recording medium and wherein the laser beam re-radiated by said spatial modulating means is illuminated on an information recording area of said heat sensitive recording medium for recording desired data.

11. An apparatus for recording information using a laser beam comprising:

laser beam radiating means for generating a laser beam;

a collimator lens for collimating said laser beam into a collimated laser beam;

a diffraction lattice for forming a first laser beam and a second laser beam from said collimated laser beam emanating from said collimator lens, and for re-radiating said first and second laser beams;

a light modulator having a first aperture line illuminated with said first laser beam and a second aperture line illuminated with said second laser beam;

a cylindrical lens for illuminating said first and second laser beams on said first and second aperture lines of said light modulator, respectively; and an image-forming lens for converging said laser beam re-radiated from said light modulator on said recording medium for forming an image.

12. The apparatus according to claim 11 wherein said cylindrical lens is intermediate the light modulator and the diffraction lattice for forming an image of said diffraction lattice at a point of intersection of an entrance pupil of said image-forming lens with the optical axis.

13. The apparatus according to claim 11 wherein said diffraction lattice is placed at a focal point of said cylindrical lens, said laser beam being collimated and being incident with a minimum angle of incidence on said light modulator.

14. An apparatus for recording information using a laser beam comprising:

laser beam radiating means having a laser beam radiating area; and spatial modulating means for modulating the laser beam radiated from said laser beam radiating means in accordance with information to be recorded, wherein said spatial modulating means is provided within a depth of focus of said laser beam, the focal point of which is intermediate between said light modulating means and said recording medium, the spatial modulating means including a modulator having an irradiated area, said laser beam radiating area corresponding to the modulator irradiated area, and said laser beam re-radiated from said spatial modulating means on said recording medium for recording the desired information on said recording medium.

15. An apparatus for recording voice data on cinefilm comprising:

laser means for generating a laser beam having a laser beam path;

a magnifying lens positioned in said path of said laser beam and adjacent said laser means;

spatial modulating means for modulating and re-radiating a laser beam generated by said laser means and passed through said magnifying lens, and including a voice data input, said modulator being adapted for being driven responsive to said data, said modulator being positioned within a depth of focus of said laser beam along said beam path; and an image forming lens positioned along said beam path for focussing a laser beam re-radiated by said modulator onto cinefilm.

* * * * *